US010942898B2

(12) United States Patent
Testardi

(10) Patent No.: US 10,942,898 B2
(45) Date of Patent: Mar. 9, 2021

(54) SYSTEM AND METHOD FOR A PERSISTENT HIERARCHICAL WORK MANAGER

(71) Applicant: Microsoft Technology Licensing, LLC, Redmond, WA (US)

(72) Inventor: Richard Paul Testardi, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 15/966,308

(22) Filed: Apr. 30, 2018

(65) Prior Publication Data

US 2019/0332689 A1  Oct. 31, 2019

(51) Int. Cl.
*G06F 16/17*  (2019.01)
*G06F 16/22*  (2019.01)
*G06F 16/176*  (2019.01)

(52) U.S. Cl.
CPC ...... *G06F 16/1734* (2019.01); *G06F 16/1774* (2019.01); *G06F 16/2246* (2019.01)

(58) Field of Classification Search
None
See application file for complete search history.

(56) References Cited

U.S. PATENT DOCUMENTS

| | | | | | |
|---|---|---|---|---|---|
| 5,680,640 | A | * | 10/1997 | Ofek | G06F 3/0607 710/19 |
| 5,794,006 | A | * | 8/1998 | Sanderman | G06F 16/958 709/223 |
| 5,896,548 | A | * | 4/1999 | Ofek | G06F 3/0607 710/20 |
| 6,108,748 | A | * | 8/2000 | Ofek | G06F 3/0607 711/100 |
| 7,272,609 | B1 | * | 9/2007 | Bakey | G06F 16/9574 |
| 2005/0198605 | A1 | * | 9/2005 | Knol | G06F 30/392 716/124 |
| 2007/0266056 | A1 | * | 11/2007 | Stacey | G06F 16/185 |

(Continued)

OTHER PUBLICATIONS

"International Search Report and Written Opinion Issued in PCT Application No. PCT/US19/026418", dated Nov. 4, 2019, 11 Pages.

*Primary Examiner* — Kim T Nguyen
(74) *Attorney, Agent, or Firm* — Fiala & Weaver P.L.L.C.

(57) ABSTRACT

Methods for performing work operations and management of hierarchical datasets are performed by systems and devices. Changes to portions of information in datasets are made via client devices, and such changes are intercepted by an independently-operating tracker. The tracker flags portions being changed as work needed, along with any other dataset portions from which the portion to be changed depends. A work service independently discovers portion(s) designated as work needed to perform work thereon, while dataset branches/leaves not flagged are ignored in discovery. Upon work completion, any changes made to the portion(s) that underwent the work, or to any depending portions, while the work was performed are identified. Such changes result in aborting the performed work and setting work needed indications for any changed dependents. Work is re-performed for the portion when all portion and dependent portion work completes. Work is then performed for higher-level portions that are flagged.

20 Claims, 5 Drawing Sheets

(56) References Cited

U.S. PATENT DOCUMENTS

2008/0183773 A1 7/2008 Choy
2009/0013133 A1* 1/2009 Cypher .............. G06F 12/0842
　　　　　　　　　　　　　　　　711/130
2014/0317158 A1 10/2014 Jiang et al.

* cited by examiner

SYSTEM AND METHOD FOR A PERSISTENT HIERARCHICAL WORK MANAGER

BACKGROUND

Managing large datasets is a common challenge for network hosts. Allowing user access to datasets that continually change and grow conflicts with the ability of network hosts to work on and manage the data. Current management and work solutions may involve different forms of journaling for changes to datasets followed by replaying the journal using a work transformation engine to figure out what actually changed in the dataset, and how such changes impact work results. With journaling mechanisms, multiple changes in a dataset typically result in multiple journal entries with no temporal coalescing, and updating the journal has significant performance impacts. Similarly, current solutions mainly involve scanning an entire dataset each time determinations are made for portions of the dataset needing work performed, as well as for determining sizes of datasets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for performing work operations and management of hierarchical datasets are performed by systems and devices. A coherent, hierarchical model reduces performance penalties for first-time ingress into datasets, as well as providing temporal coalescing that current systems lack. Accordingly, techniques are provided herein for efficient performance of work operations and management of hierarchical datasets.

Changes to portions of information in datasets made by client devices are intercepted by a change tracker (e.g., at a filesystem filter driver). The change tracker flags portions being changed as "work needed," along with flagging any other dataset portions upon which the flagged portions depend (e.g., a directory that includes a changed file, parent directories of a changed directory, etc.). Independent of the change tracker, a work service discovers the portions flagged as "work needed" to perform work on them and generate work results, while dataset branches/leaves not flagged are ignored. Upon work completion, the portions that underwent the work (or any depending portions thereof) that were changed while the work was being performed, are identified. The work results are discarded for those portions identified as changed, and "work needed" flags remain set for worked-on portions and parents thereof, and/or are set for any changed dependents of the worked-on portions. Work will be re-performed for the portions having work results aborted at a later time, e.g., when any/all work for dependent portions thereof completes, and work results for a portion of the dataset will be accepted into the hierarchy when not aborted. Work is then performed for higher-level or subsequent portions that are flagged.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 5A-5D each show a diagram of a hierarchical dataset, in accordance with example embodiments.

Figure 6:
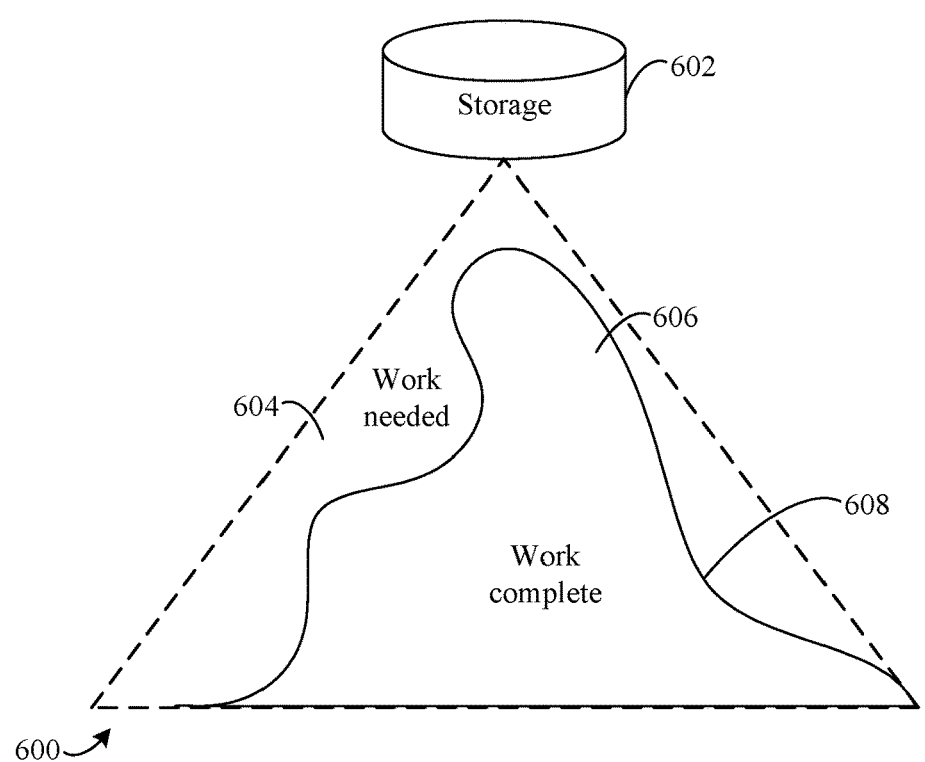

FIG. 6 shows a diagram of a hierarchical dataset, in accordance with an example embodiment.

Figure 7:
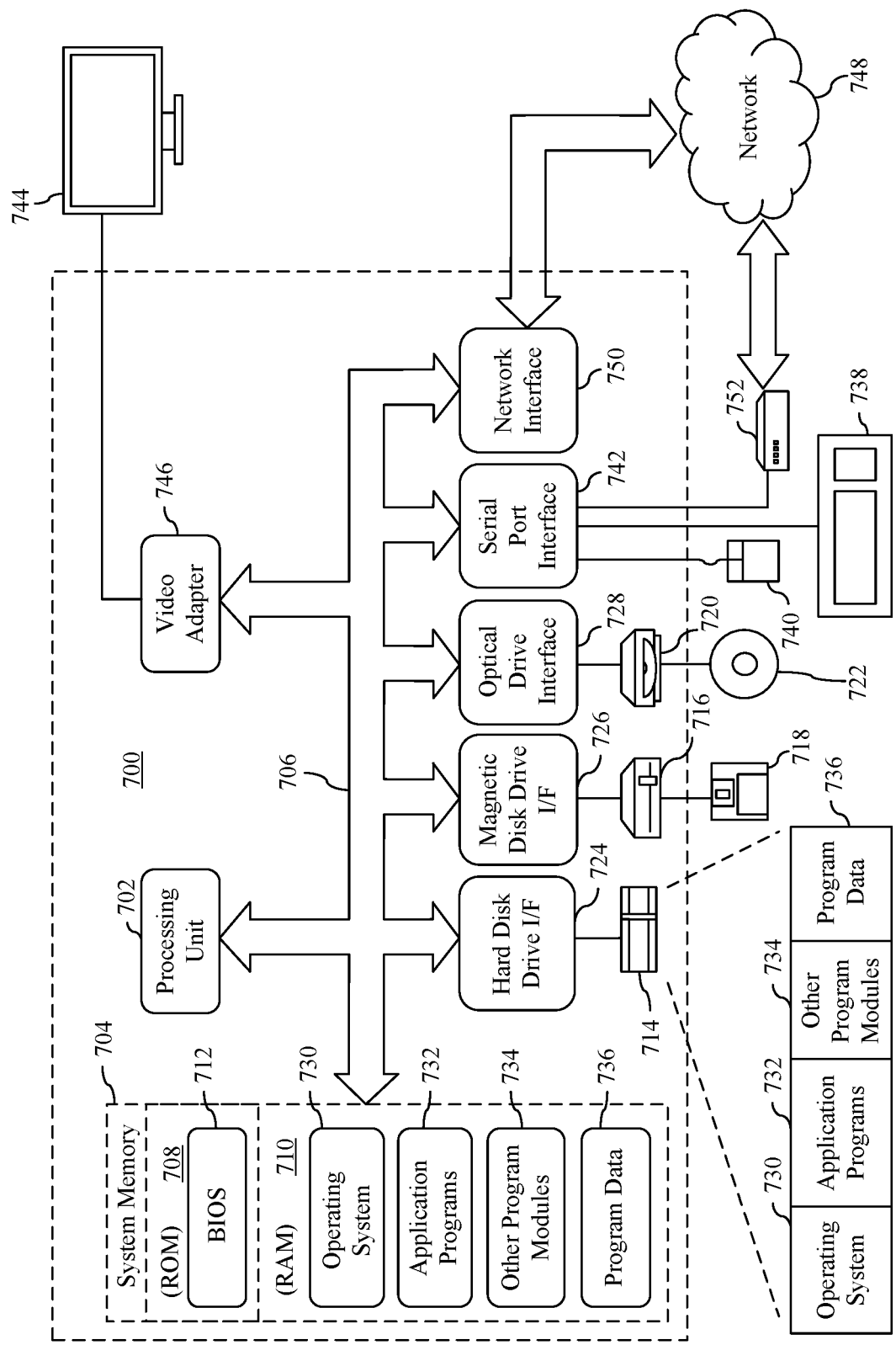

FIG. 7 shows a block diagram of an example computing device that may be used to implement embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for performing work operations and management of hierarchical datasets, where Section II.A describes example embodiments for systems that manage hierarchical datasets and perform work and Section II.B describes example embodiments for hierarchical datasets. Section III below describes computing device embodiments that may be used to implement features of the embodiments described herein. Section IV below describes additional examples and advantages, and Section V provides some concluding remarks.

II. Example Embodiments

Methods, systems, and devices are provided for performing work operations and management of hierarchical datasets. The disclosed embodiments provide for a coherent, hierarchical model that reduces performance penalties to low or no impact for first-time ingress into datasets, as well as provide for temporal coalescing that is lacking in the current state of the art. In other words, embodiments allow for quickly finding what operations need to be performed on datasets, and also efficiently perform any such operations on datasets. It is contemplated herein that any types of datasets/bodies of information, including hierarchical datasets and filesystems, large or otherwise, may be implemented in accordance with the disclosed embodiments.

Managing large persistent hierarchical datasets is both resource intensive and slow. Large persistent hierarchical datasets may be accessed or changed by client devices that execute readers/writer operations, and such datasets may be continually growing. A large persistent hierarchical dataset is characterized by, without limitation, one or more of the following characteristics: much of the dataset is unchanging, hierarchical names are used to identify and divide portions of the dataset (e.g., between different branches and leaves), the dataset may be distributed over various tiers and/or speeds of storage in various geographies and/or topologies, the cost of scanning the entire dataset after its initial creation may be relatively high, and the entire dataset may not be accessible at the same time. In performing work operations that require non-trivial effort on portions of datasets, such as large persistent datasets, as the datasets incrementally change (including multiple portions changing concurrently), the disclosed embodiments avoid re-performing work on the entire dataset, and re-performs work only in proportion to the size of the incremental change of the dataset. Accordingly, no changes to datasets results in no work being performed, small incremental changes to datasets result in small incremental work being performed, and so on. In other words, a small change to a dataset does not result in potentially unbounded work being performed. It should be noted that the work may be performed once initially on each portion of the entire dataset at its first ingress, yet for subsequent changes and performance of work operations, work is not performed on the same data twice.

Accordingly, the disclosed embodiments are enabled to compute and persist work results on portions of the persistent dataset, identify changes to portions thereof, invalidate work results on portions of the dataset as they change, re-compute work on portions of the data after the changes, and re-aggregate work results from the changed portions into larger, unchanged portions of the dataset up to the root level. That is, logically, it may be desired to compute the root level work result (and all intermediate directory or file results) for the dataset after each and every change thereto. While physically, it may be desired to do as little work as possible, without re-computing work results for portions of datasets that have not changed. When a dataset is continuously changing, the performance of work may lag or be behind the most recent dataset changes, yet the embodiments herein allow for the work to be relatively little behind. Additionally, little if any unnecessary work is performed so that catching up on work is as efficient as possible should changes to the dataset momentarily pause.

It is noted that datasets may include different types of information, including but without limitation, research information, company information, financial information, medical information, document repositories, software development projects, and/or the like.

Accordingly, as a dataset changes, "work" that has previously been computed on the dataset needs to be definitively re-computed for the changed portions of the dataset, and re-aggregated into a new and full dataset result. Changes initiated by users may include any change to the persistent hierarchy, such as creating or destroying or writing a file, creating or destroying a directory, moving a file or directory, etc. According to the embodiments herein, recomputed work is only performed and completed once for a changed portion. As used herein, "work" is any computation and/or transformation of data that can be performed on portions of the dataset independently, and then hierarchically aggregated into cumulative dataset results that may be used to form a single cumulative result at the root level. Work may include, without limitation, lossy transformations (e.g., computing the size or a hash of a dataset), non-lossy transformations (e.g., mirroring or copying of the dataset), examining datasets for validity, and/or aggregating files (e.g., small files, in datasets), which are maintained incrementally through tracking as the dataset changes.

The disclosed embodiments allow for running distributed tasks in parallel, but unlike current solutions, the disclosed embodiments also allow for running distributed tasks at different times (e.g., different portions of the dataset may only be accessible at different times), and more than once as portions of the dataset subsequently change. However, when tasks are repeated, only necessary portions of the hierarchical aggregation are performed to get a new and updated cumulative dataset result. Work may be performed in parallel for different portions of the dataset when the different portions are not hierarchically parents or children of each other. Accordingly, when multiple portions of the dataset are concurrently being ingressed, modified, deleted, etc., work on such portions may be performed in parallel.

For example, large filesystem hierarchies may have sizes in the order of many petabytes with millions or billions of files. Users desiring to query the storage size consumed by an arbitrary directory of such large filesystem hierarchies (including all its children, recursively), would have to recursively re-scan all the children of the directory at the time the query is made, a costly O(n) operation, made even more costly for slow storage solutions. Maintaining information such as storage size in advance is difficult, because files and directories can be created and destroyed, in any location at any time, including concurrently; files and entire directory hierarchies can be moved from one location of the filesystem to another, affecting both source and destination sizes; and in the presence of failure scenarios, the filesystem cannot guarantee the outcome of any filesystem operations further complicating work performed and coherency. Failure scenarios, in particular, require that after changing the filesystem, the only sure way to determine the net effect of any changes is to re-query the filesystem to see what actually happened.

According to the disclosed embodiments, the recursive size of each directory in a large filesystem hierarchies may be stored (e.g., logically and/or geographically) along with the directory, ready to be queried in O(1) time, rather than O(n), or even periodic caching of results which is inaccurate, as in current solutions. That is, while a portion of the filesystem was changing, only its size and its parent directory sizes are temporarily invalidated, until the re-scan for only that portion of the filesystem hierarchy is completed. Changes from child directories are "rolled up" into parent directories, which also only affects the stored sizes for small portions of the overall hierarchy (though also typically affecting the stored size for the root of the hierarchy).

More complex examples also requiring strict accuracy of work performed and data include creating hashes and mirrors/copies of large filesystem hierarchies. Still considering a large filesystem hierarchy, if the user wants to "certify" the entire state of the hierarchy at a point in time, a hierarchical cryptographic hash of the entire filesystem may be generated by reading all leaf files of the filesystem hierarchy, and then cryptographically hashing leaf files into key (file name)/value (hash) pairs for parent directories of given files. Cryptographically hashing subdirectory key/value pairs into key (subdirectory name)/value (hash) pairs for the parent directories of the subdirectories is then performed recursively up to the root directory.

However, such hashing operations involve reading and hashing all of the filesystem data, an even more costly O(n) operation than computing directory size in the example above. Prior solutions do not provide efficient handling for small changes made to the huge dataset, or for determining how much of the dataset needs to be re-read and re-hashed to re-generate the root hash of the filesystem—it is very difficult to maintain a hierarchical cryptographic hash for a large, persistent dataset at least because of inefficient handling for failure scenarios, and because of performance costs where a synchronous hash computation is in the write path for the data. In contrast, the disclosed embodiments more efficient hashing operations, reducing processing cycles and memory footprint, and thus power consumption, by performing work (i.e., compute cryptographic hashes, in this example) a single time for a given set of data in a filesystem hierarchy. That is, work is not performed on the same data twice. Because key/value pairs are stored from the bottom-up in the hierarchy, only changed data requires new work for hashing, while unchanged data key/value pairs are stored in respective directors for any new work required above in the hierarchy.

Finally, rather than hashing the data hierarchically, an example is described here to mirror/copy the data, byte for byte by value, hierarchically, to a parallel location using a similar approach as shown above. For instance, when changes (inserts, deletes, modifications, and/or the like) are made to a large persistent hierarchical dataset, only those changes get mirrored/copied to the parallel location. Again, the work is not performed on the same data twice.

These examples of "work" according to the disclosed embodiments are non-limiting and illustrative in nature. In other words, the embodiments disclosed herein efficiently perform work operations and management of hierarchical datasets with coherency and temporal coalescing that improves the performance of hosting systems while strictly maintaining data integrity. In the described examples, directories (a portion of a dataset identified by a graph of directory names, that contains zero or more subdirectories and/or files), files (a portion of the dataset identified by a graph of directory names and a file name, that contains zero or more file portions), file portions (a portion of the dataset identified by a graph of directory names and a file name and file offset, that contains zero or more bytes of actual binary data), and/or the like that are stored in hierarchical datasets and on which work is performed may be referred to as data objects.

As used herein, a "change" to the state of any directory, file, or file portion in a dataset includes initially ingressed data, modified data after initial ingress, deleted data, and/or the like. "Work needed" includes indications for scenarios in which a directory (or any of its dependent child data objects), files, or file portions have been changed since work was last performed, and "work complete" includes indications for scenarios in which a directory (or any of its dependent child data objects), file, or file portion has not been changed since work was last performed. Work needed and work complete may be conceptually opposite senses of the exact same persistent flag/indication, according to embodiments. That is, if work is needed, work is not complete-likewise, if work is complete; work is not needed. "Aborted" work operations or work results includes scenarios for which a directory (or any of its dependent child data objects), file, or file portion has been changed since work was most recently attempted and before attempted work was actually completed.

The start of a work transformation attempt via work operations may be referred to as "open for work" and occurs when a directory, file, or file portion is in the work needed state. The work transformation may involve accessing the directory, file, or file portion to perform the work transform on its current contents. The end of the work transformation may be referred to as "close for work" and occurs at the end of work transformations. When a directory, file, or file portion is not aborted by changes concurrent to the work transformation being performed, work completes and the directory, file, or file portion is transitioned to the work complete state; otherwise, the directory, file, or file portion remains in the work needed state.

These and further embodiments are described in greater detail as follows.

Figure 1:
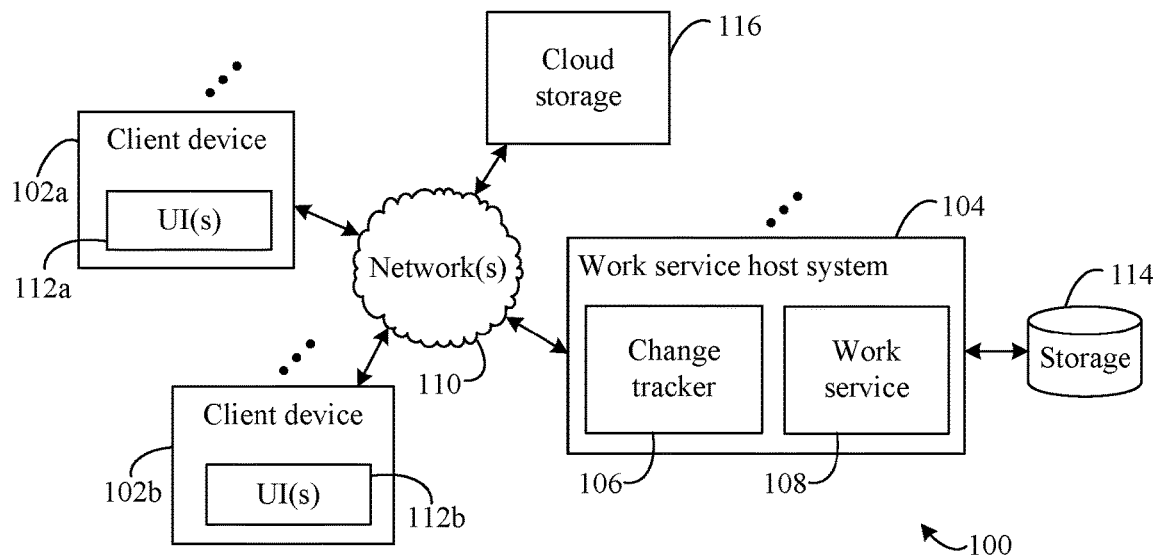
FIG. 1 shows a block diagram of a networked system that includes a management host system for performing work operations and management of hierarchical datasets, according to an example embodiment.

A. Example Embodiments for Systems that Manage Hierarchical Datasets and Perform Work In embodiments, systems and devices may be configured in various ways for performing work operations and management of hierarchical datasets. For instance, FIG. 1 is a block diagram of a networked management system 100 ("system 100"), according to embodiments. System 100 is configured to perform work operations and management of hierarchical datasets. As shown in FIG. 1, system 100 includes a client device 102*a*, a client device 102*b*, a work service host system 104, and a cloud storage system 116 which may communicate with each other over a network 110. It should be noted that any numbers of client devices, management host systems, developer systems, and/or cloud storage systems may be present in various embodiments. Additionally, any combination of the components illustrated in FIG. 1 may be present in system 100, according to embodiments.

As noted above, client device 102a, client device 102b, work service host system 104, and cloud storage system 116, are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

Cloud storage system 116 may comprise one or more server computers or computing devices, which may include one or more distributed or "cloud-based" servers, or any other type of computing device that manage storage devices, as described herein. Such storage devices may include any type of physical hardware storage, and may comprise mass storage racks, clusters, datacenters, etc. Cloud storage system 116 may include portions of different topologies and/or geographical locations. Cloud storage system 116 may store datasets, including very large hierarchical filesystem datasets, for any type of application and/or purpose, including without limitation, data/information for online stores, financial practices, inventory systems, the "Internet of Things" (IoT), any other type of data/information for web services and/or online applications, etc.

Work service host system 104 may comprise one or more server computers or computing devices, which may include one or more distributed or "cloud-based" servers. Work service host system 104 may include internal or external storage, which may be distributed, such as but not limited to, storage 114. Work service host system 104 is configured to perform work on, and provide management for, datasets and bodies of information maintained in storage devices. In embodiments, work service host system 104 may be configured to store managed datasets. It is contemplated herein that any number of datasets may be stored and/or managed by work service host system 104. Remote databases or storage, such as storage 114, communicatively connected via network 110 or otherwise, may be utilized as part of work service host system 104.

Work service host system 104 also includes a change tracker 106. Change tracker 106 is configured to track accesses and changes to datasets from client devices, e.g., client device 102a and/or 102b, or from other devices enabled to make changes to datasets. For example, change tracker 106 is configured to intercept and/or monitor incoming requests for datasets and mark files and/or directories for which changes are made. Marking may be performed before changes are made, in embodiments. Change tracker 106 is configured to mark any parent directories from which changed files and/or directories depend, as described in further detail below. Files and/or directories thus marked by change tracker 106 may have indicia of changes persistently stored therewith in their respective storage devices.

The background work service described herein depends on change tracker 106 and the filesystem filter driver to manage changes to the dataset and work coherency, along with persistent work needed flags and volatile work aborted flags. The filesystem filter driver intercepts client change requests to datasets (which may be stored locally on a filesystem, remotely on the cloud, or anywhere in-between) and synchronizes them as needed with the open for work and close for work operations from the work service as it attempts to both discover new work to be performed and catch up on work by performing work transformations. In this way, coherent work results are produced for the entire dataset or portions of the dataset while not blocking client access to the dataset. In other words, hierarchical readers/writer locks, along with the work aborted flags, enable client changes of the dataset to take place at full speed, at the expense of unproductive work, i.e., discarding work results, which will later need to be repeated. Even in rare cases where an exclusive readers/writer lock is taken to include work results in a dataset and this lock interferes with a client request to access/change data objects in the dataset, the requested change is only delayed by milliseconds or even microseconds during this exclusive lock.

As illustrated, work service host system 104 also includes a work service 108. Work service 108 is configured in various ways for performing work and management functions for datasets. For instance, work service 108 is configured to perform work operations on data objects, e.g., files and folders, etc., of datasets such as hierarchical filesystems, as described herein. In embodiments, work service 108 is configured to identify portions of datasets needing work based on markings made by change tracker 106. Various types of work described may then be performed on identified portions. Work may be ordered in a bottom-up manner such that files and/or directories without dependencies, or files and/or directors for which dependent portions do not need work, are handled first.

In embodiments, change tracker 106 is independent of work service 108 and may be configured to work asynchronously with respect to work service 108 which allows for work coherency to be maintained. Work operations may be performed, or performed again, on data objects of a dataset when: (i) new data is ingressed into the dataset (e.g., first-time work operations for new data objects in a dataset to aggregate new work results into the existing work results already generated on existing data); (ii) existing data objects in the dataset are modified (e.g., previous work results for existing data objects are invalidated, work results are generated for the new data by performing the work operations again, and the new work results re-aggregated into the existing work results for existing data objects); and/or (iii) existing data objects in the dataset are deleted (e.g., previous work results are invalidated and then un-aggregated from the previous work results for existing data objects).

Once work operations begin on a new portion of the dataset, if that same portion of the dataset is changed before completing the work, the result of the latest work operation(s) is already stale, and must be invalidated/discarded, rather than being aggregated back into the existing work already done on the existing data objects. Only when work operations on the new portion of the dataset are completed before that same portion of the dataset is changed again is the work result valid and aggregated into the existing work results already done on the existing data objects.

As described herein, "work coherency" may mean that an effective point-in-time result of work for the entire dataset, or large portions of the dataset, is achieved even though the entire dataset, or large portions of the dataset, may not be accessible at any single point in time. Additionally, the disclosed embodiments account for cases where changes made into an ever-changing dataset or portion of the dataset might pause even momentarily. At such points, minimal remaining work may be quickly and efficiently completed to achieve a point-in-time result of work for the entire dataset or portion of the dataset.

Client device 102*a* and client device 102*a* may be any type of computing device or computing system, a terminal, a personal computer, a laptop computer, a tablet device, a smart phone, a gaming console, a vehicle, an IoT device, a server, etc., that may be used, e.g., by users, to access and/or change datasets, as described herein. A user of client device 102*a* and/or client device 102*a* may access datasets via one or more user interfaces (UIs) such as UI 112*a* and/or UI 112*b*, respectively. In embodiments, such access may be made through change tracker 106 of work service host system 104. UI 112*a* and/or UI 112*b* may be a specific UI associated with an application related to the dataset accessed, a specific UI associated with client device 102*a* and/or client device 102*b*, a specific UI associated with an operating system as described herein, a browser or portal, a general or generic UI, and/or the like. From UI 112*a* and/or UI 112*b*, users are enabled to access and change data/ information in datasets. Datasets described herein may also be accessed by applications, operating systems, etc., of client devices such as client device 102*a* and/or client device 102*b*.

Note that as described herein, embodiments are applicable to any type of system hosting a dataset(s). In one example, work service host system 104 is a "cloud" platform/architecture for hosting a dataset to be managed according to the embodiments herein. A cloud platform/architecture may include a networked set of computing resources, including servers, routers, etc., that are configurable, shareable, provide data security, and are accessible over a network such as the Internet. Change tracker 106 and work service 108 may thus be cloud utilities/applications run on the resources, atop or within operating systems that run on the resources, for entities that access the applications over the network. A cloud platform may support multi-tenancy, where cloud platform-based software, such as work service 108, services multiple tenants, with each tenant including one or more users who share common access to software services of the cloud platform. Furthermore, a cloud platform may support hypervisors implemented as hardware, software, and/or firmware that run virtual machines (emulated computer systems, including operating systems). A hypervisor presents a virtual operating platform that may be used according to the disclosed embodiments.

Figure 2:
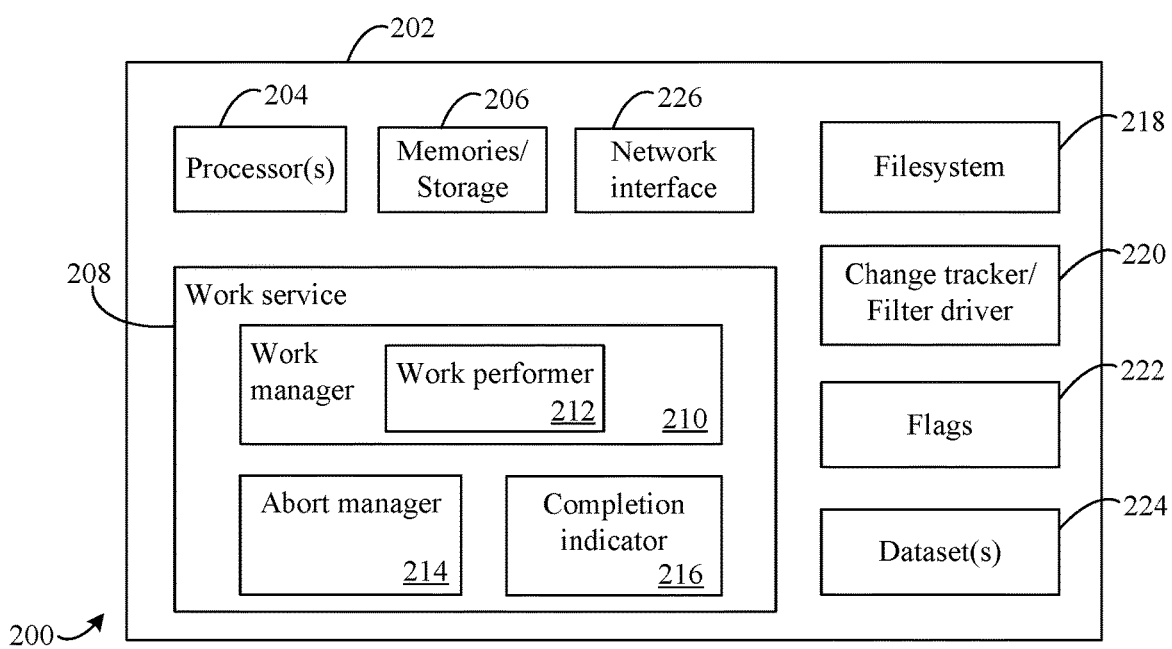
FIG. 2 shows a block diagram of a management host system performing work operations and management of hierarchical datasets, according to an example embodiment.

Accordingly, work service host system 104 may be configured in various ways to perform work operations and management of hierarchical datasets. For example, FIG. 2 is a block diagram of a management host system 200 ("system 200" herein) configured to perform work operations and management of hierarchical datasets. System 200 may be an embodiment of work service host system 104 of FIG. 1. System 200 is described as follows.

System 200 includes a work service host 202, which may be any type of server computer or computing device, as mentioned elsewhere herein, or as otherwise known, including cloud-based server implementations, distributed implementations, etc. As shown in FIG. 2, system 200 and work service host 202 include one or more of a processor ("processor") 204, one or more of a memory and/or other physical storage device ("memory") 206, one or more network interfaces ("network interface") 226, and a work service 208 that may be an embodiment of work service 108 of FIG. 1. System 200 also includes a filesystem 218, a filter driver/ change tracker 220, flags 222, and dataset(s) 224. System 200 may also include additional components (not shown for brevity and illustrative clarity) including, but not limited to, components and subcomponents of other systems herein, and, such as an external storage (e.g., storage 114 of FIG. 1), etc., as well as those described below with respect to FIG. 7, such as an operating system.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of work service 208, filesystem 218, and/or filter driver/ change tracker 220, which may be implemented as computer program instructions for performing work operations and management of hierarchical datasets, as described herein. Memory 206 is configured to store such computer program instructions/code, as well as to store other information and data described in this disclosure including, without limitation, flags 222, dataset(s) 224, work results, etc. For example, a random access memory (RAM) of memory 206 may store work aborted flags of flags 222, as described below, and may enable readers/writer locks for portions of dataset(s) 224. In some embodiments, storage 114 of FIG. 1 may also be included in system 200, e.g., as a portion of memory 206, as a persistent, non-volatile storage for dataset(s) 224, work needed flags/indications of flags 222, etc. Still further, a RAM disk of memory 206 may be used to find work needed in a dataset and/or in the performance of work operations.

Network interface 226 may be any type of wired and/or wireless network adapter, modem, etc., configured to enable system 200 to communicate with other devices over a network, such as communications between system 200 and other devices utilized in a network like network 110 as described herein, e.g., those described above with respect to FIG. 1 and system 100.

Filesystem 218 may be any type of filesystem, and may be included in or with a kernel/operating system of work service host 202. Filesystem 218 may enable hierarchical storage of dataset(s) 224, as described herein. For instance, filesystem 218 may include one or more index tables, may be of any size, may include any number of partitions, etc.

Change tracker 220 is configured to track changes to dataset(s) 224. In embodiments, change tracker 220 may comprise or be a part of a filter driver or a filesystem filter driver of a kernel, e.g., as described above for filesystem 218. Change tracker 220 may be configured to intercept incoming requests from client devices to change data objects in a hierarchical dataset, e.g., dataset(s) 224. Change tracker 220 may be configured to set work needed indications for changed data objects. For instance, a bit(s) associated with a data object in persistent storage may be set by change tracker 220. In embodiments, the bit(s) used for work needed indications may be an attribute bit for the data object that is associated with the filesystem, e.g., the "offline" attribute bit. A bit in a bitmap may be used for file portions. Accordingly, filesystem directory enumeration application programming interfaces (APIs) may be used to query the work needed flags for all child data objects of a directory (as well as the names for all children of the directory) using a single API call.

When requests to change data objects are intercepted, change tracker 220 may be configured to set an abort flag for the data object and for each other data object from which the data object to be changed depends up to the root director of the dataset. For example, while work operations are performed on a data object in a dataset by work manager 210 as described herein, change tracker 220 may set an abort flag for the data object if a change is made to the data object. In examples where a child data object of the data object is changed during performance of a work operation on the data object, abort flags may be set for both the data object and the child data object, as well as for any other data objects depending from the data object and from which the child data object depends.

Dataset(s) 224 may include, without limitation, any type of information. Dataset(s) 224 may be hierarchically stored, and may include a root directory, and one or more child/dependent data objects, as exemplarily shown in and described with respect to FIGS. 5A-5D below.

Work service 208 includes a plurality of components for performing the techniques described herein for performing work operations and management of hierarchical datasets. As shown, work service 208 includes a work manager 210, an abort manager 214, and a completion indicator 216. While shown separately for illustrative clarity, in embodiments, one or more of work manager 210, abort manager 214, and/or completion indicator 216, may be combined together and/or as a part of other components of system 200. In some embodiments, less than all of the components of work service 208 illustrated in FIG. 2 may be included. In software implementations, one or more components of work service 208 and/or work service host 202 may be stored in memory 206 and may be executed by processor 204.

Work manager 210 is configured to manage work performed on data objects and datasets, and to perform the work. In embodiments, a work performer 212 may be included in work manager 210 to perform various work operations described herein. For instance, work operations may include, without limitation, maintaining a size of the hierarchical dataset, creating a hash of the hierarchical dataset, creating a mirror or copy of the hierarchical dataset, determining validity of one or more portions of the hierarchical dataset, aggregating files of the hierarchical dataset, and/or the like. Work manager 210 may be configured to perform work operations independently and/or asynchronously of functions performed by change tracker 220, and may be configured to perform the work operations on data objects without a readers/writer lock. The performance of work operations on data objects causes work results to be generated. For example, when a size of a dataset is being determined by work operations, the work result generated for a data object includes the size of the data object and any child data objects depending therefrom. In embodiments, work manager 210 may be configured to clear an abort flag for a data object prior to performing work operations thereon.

Work manager 210 may be configured to recursively crawl over the data objects in a dataset until all data objects having a work needed indication set are identified/determined. When a data object has its work needed indication cleared, work manager 210 may be configured to ignore the data object and any child data objects thereof for this identification/determination. Work manager 210 is configured to perform work operations on data objects having work needed indications in a bottom-up manner, such that each child data object is worked on prior to its immediate parent data object being worked on. Work manager 210 may be configured to clear an abort flag for a data object prior to work operations being performed thereon. In some embodiments, it is contemplated that child data objects of a parent data object may have worked performed thereon in various orders without yet designating the parent data object as open for work. In such cases, private knowledge, e.g., information outside of the filesystem crawl, that is associated with the child data objects and/or the parent data object may be used. Such information may be determined from prior work attempts that were aborted, prior filesystem crawls, etc. Accordingly, work needed may be identified and undertaken between crawls of the filesystem, and system/dataset efficiency is improved as filesystem crawls may be single-threaded processes and many filesystem implement separate directories with separate locking mechanisms. In other words, working on two files in the same directory may encounter contention due to filesystem locking between files, whereas, working on two files in two different directories typically will encounter no contention and therefore accomplish work twice as fast.

Abort manager 214 is configured to manage abort flags (e.g., abort indications) for data object on which work is being performed. For instance, abort manager 214 may be configured to clear an abort flag for a data object prior to work operations being performed thereon. Abort manager 210 is also configured to determine if abort flags for data objects are set during work operations.

Completion indicator 216 is configured to accept or add work results into the hierarchy. Completion indicator 216 is also configured to clear work needed indications (i.e., to set work completed indications) for data objects. For instance, when work operations for data objects are completed, and are not aborted, completion indicator 216 performs its functions as described herein. Work results may be stored persistently with associated data objects in memory 206. In embodiments, completion indicator 216 may be configured to perform its functions via change tracker 220. That is, completion indicator 216 may provide requests, commands, or instructions to change tracker 220 to perform these functions.

Figure 3:
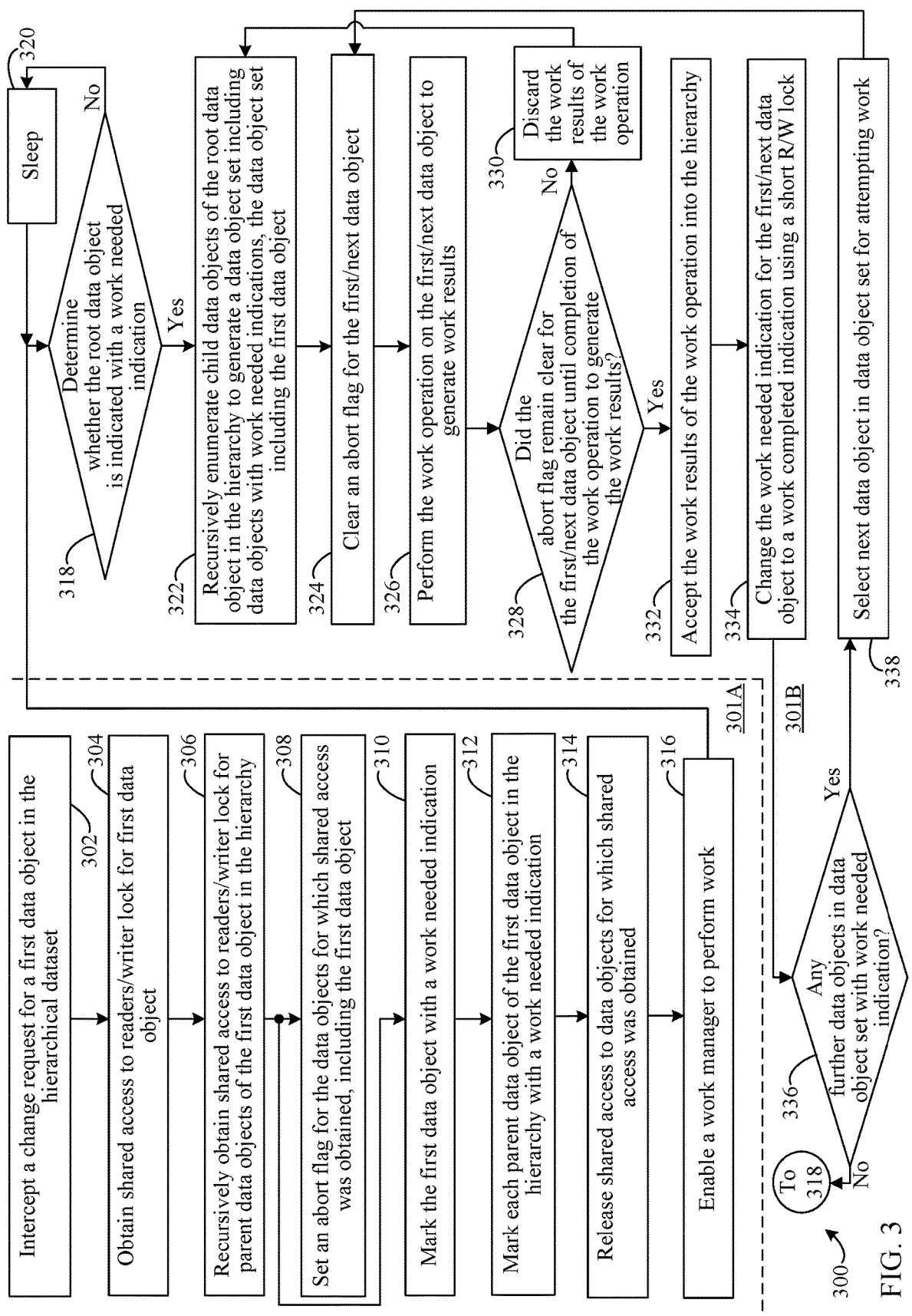
FIG. 3 shows a flowchart for performing work operations and management of hierarchical datasets, in accordance with an example embodiment.

Accordingly, work service 208 may operate in various ways to perform work operations and management of hierarchical datasets. For instance, FIG. 3 shows a flowchart 300 for performing work operations and management of hierarchical datasets, according to an example embodiment. Work service 208 may operate according to flowchart 300. Further structural and operational examples will be apparent to persons skilled in the relevant art(s) based on the following description. Flowchart 300 is described as follows with respect to system 100 of FIG. 1 and system 200 of FIG. 2.

Flowchart 300 begins at step 302. In step 302, a change request is intercepted for a first data object in the hierarchical dataset. For instance, a change request from a client device, e.g., client device 102a or client device 102b, may be provided to work service host 202, via network 110, to change a data object of hierarchical dataset of dataset(s) 224. Change tracker 220 is configured to intercept such a change request. In an example, a change request goes through filesystem 218 which is associated with the dataset where change tracker 220 intercepts the request.

In step 304, shared access is obtained to a readers/writer lock for the first data object. For example, a change to a data object as requested in step 302 may require a readers/writer lock via through filesystem 218. Change tracker 220 is configured to obtain shared access to this lock for the first object, e.g., to enable change tracker 220 to set work needed indications for affected data objects. That is, because work needed indications may be embodied in a filesystem-related file attribute bit(s) and/or stored persistently with data object information, shared access to the readers/writer lock enables change tracker to set the work needed indications. Readers/writer locks may be configured as volatile, e.g., stored in a RAM of memory 206, and may correspond to any type of data object of the dataset to synchronize between changes to the dataset and work attempts on the dataset.

In step 306, shared access to the readers/writer lock is recursively obtained for parent data objects of the first data object in the hierarchy. For instance, change tracker 220 is configured to obtain shared access to the readers/writer lock for the parent data object of the data object of the dataset to be changed and for each successive parent data object up to the dataset root in order to enable the setting of the work needed indications. In other words, a change to a child data object affects work operations on all parent data objects on which the child object depends, therefore each parent of a data object to be changed will require work operations to be performed. Accordingly, like the work needed and work aborted flags described herein, the readers/writer lock is also hierarchical.

In step 308, an abort flag is set for the data objects for which shared access was obtained, including the first data object. For example, change tracker 220 is configured to set abort flags in a RAM of memory 206. The abort flags set are associated with the first data object to be changed, and for each of its parent data objects up to the root of the dataset. That is, abort flags are set recursively and hierarchically up to the root level. The abort flags indicate to work manager 210 and abort manager 214 that any work results for work operations currently being performed for the data objects or parents thereof should be discarded because the underlying data objects will change.

In step 310, the first data object is marked with a work needed indication. In step 312, each parent data object of the first data object is in the hierarchy is marked with a work needed indication. As noted above, change tracker 220 is configured to mark a data object to be changed, along with its parent data objects up to, and including, the root of the dataset, with work needed indications. In embodiments, if a data object already has its work needed indication set, the work needed indication may remain set. This enables work service 208 to later identify data objects needing work operations to be performed because data in the dataset has changed. In embodiments for datasets managed by filesystems, the work needed indication (or flag) may be stored for various data objects as follows. For directories, work needed indications indicate that work needs to be performed on one or more child directories or one or more portions of one or more files beneath the directory. For files, work needed indications indicate that work needs to be performed on one or more portions of the file. For file portions, work needed indications indicate that work needs to be performed on a portion of the file between some start and end address range.

The work needed indication for a data object may be set when data is initially ingressed to the dataset, and/or when data is subsequently modified or deleted. For file creation, this action has no cost because files can be created with the work needed attribute set just as quickly as without the work needed attribute set. For example, in a case where 10 files are copied to a directory, the first file may incur a small penalty to set the work needed flags for its parent directory and any further parent directories up to the root, but then the next 9 files do not incur the penalty. And because all 10 files may be created/ingested with work needed flags set, all 10 files are enabled to be identified when looking for work to do.

In step 314, shared access to data objects for which shared access was obtained is released. For instance, change tracker 220 is configured to release its shared readers/writer lock access upon completion of the preceding steps. In step 316, a work manager is enabled to perform work. In other words, when change tracker 220 releases its shared readers/writer lock as described in flowchart 300 above, work service 208 is enabled to perform work operations on the changed data object, and its parent data objects, as these data objects are no longer locked.

As shown in FIG. 3, the preceding steps of flowchart 300 are denoted as steps 301A, which may be performed by change tracker 220. The following steps of flowchart 300 are denoted as steps 301B, which may be performed by work service 208.

Flowchart 300 continues with step 318. In step 318, it is determined whether the root data object is indicated with a work needed indication. For example, work manager 210 of work service 208 is configured to determine if data objects in a dataset have work needed indications set. In embodiments, the first data object checked by work manager 210 may be the root data object of the data set. As noted above, if a data object in a dataset has a work needed indication that has been set by change tracker 220, each parent data object up to the root will also have its respective work needed indication set.

If the root data object does not have a work needed indication, flowchart 300 proceeds to step 320 where work service 208 sleeps or goes into a stand-by mode. The amount of time in sleep or stand-by may be a preset value of zero or more of any unit of time. In some embodiments, work service 208 sleeps or goes into a stand-by mode until change tracker 220 intercepts an incoming change request for a dataset, until a readers/writer lock is released for an object of a dataset, and/or the like.

If the root data object does have a work needed indication, flowchart 300 proceeds to step 322. In step 322, child data objects of the root data object in the hierarchy are recursively enumerated to generate a data object set including data objects with work needed indications, the data object set including the first data object. For example, if work is needed on the root directory, work manager 210 is configured to enumerate the child data objects of the root directory, thereby not only discovering the names of all of the child data objects of the root directory (which may be files, subdirectories, etc.), but also discovering the "work needed" flags set for all of the child data objects of the root directory. Accordingly, this portion of the dataset is open for work and work manager 210 begins tracking for changes to the dataset. In embodiments, because the work needed flags/indications may be stored as a file attribute (e.g., a bit), these flags/indications may be returned by the filesystem directory enumeration API. For each child directory that is indicated as work needed, work manager 210 is configured to recursively descend into the child directory and identify its children that are also indicated as work needed, until leaf nodes (e.g., files and file portions) are reached. For each child file and/or file portion, that is indicated as work needed, work manager 210 is configured to attempt to perform work, e.g., via work performer 212. It should be noted that in cases where file portions have work needed indications, the files of which the file portions are a part also have work needed indications (i.e., where the file is the parent object and the file portions are dependent children thereof).

Step 322 may be performed concurrently for sibling child data objects, including file portions, the hierarchy using a "parallel for each" construct rather than "for each" construct as there is no single-threaded requirement for performing this step with respect to data objects that do not share dependency with each other. On the way back up the hierarchical recursion, for each directory whose children are now indicated as work complete, subsequent to generating valid work results, work manager 210 is configured to attempt to continue performing the work, e.g., via work performer 212. It should be noted that the recursive approach described herein is exemplary in nature, and enumeration of data objects with work needed indications may be performed in other ways, including but not limited to, randomly, based on dataset owner preference, based on importance of data/data objects, based on type, private knowledge, etc.

In step 324, an abort flag for the first/next data object is cleared. For example, in a first iteration of steps 301B, work manager 210 is configured to clear from RAM an abort flag for the first data object that was requested to be changed prior to performing work operations. Accordingly, the data object will open for work. In subsequent iterations, for performing work operations on each successive parent data object, the parent data objects may have their abort flags cleared by work manager 210.

In step 326, the work operation is performed on the first/next data object to generate work results. For instance, work performer 212 of work manager 210 is configured to perform work operations on the first data object that was requested to be changed. Work performer 212 is configured to read the contents of the changed data objects in the process of attempting/performing the work operations. This may include metadata stored in the underlying filesystem or with data object, e.g., data object size, as well as child data object work results that may be read recursively. That is, because parent data object work is attempted when it is believed that child data object work is complete, the parent work transformation depend on the child work results. Accordingly, hierarchically aggregated work results are enabled to be provided at least because if any child data object of the parent data object is changed while parent work is being attempted, parent work results are be aborted and not accepted into the hierarchy. Thus, when parent work is later repeated, the more recent child work results will be present in a new aggregation step. In this way, as noted above, work service 208 does not attempt to perform work on the exact same portion of the dataset more than once at a time, because work service 208 decides upon which portions of the dataset to attempt to perform work.

Once contents and data are read, work operations are performed to transform the data of the changed data objects. In subsequent iterations for performing work operations on each successive parent data object in steps 301B, the parent data objects may have work operations performed by work performer 212.

In step 328, it is determined if the abort flag remained clear for the first/next data object until completion of the work operation thereon to generate the work results. In embodiments, abort manager 214 is configured to perform this determination by reading the status of the abort flag for a given data object from RAM. Accordingly, the data object will close for work. If the abort flag was set, i.e., did not remain clear, flowchart 300 continues to step 330 where the work results of the work operation are discarded and the work needed indication is maintained. After step 330, flowchart 300 returns to step 322.

If the abort flag remained clear and the data object will close for work, flowchart 300 continues to step 332. In step 332, the work results of the work operation are accepted into the hierarchy. For example, completion indicator 216 may be configured to accept the work results for the work operation on a data object into the hierarchical dataset. In embodiments, the work results may be stored persistently with the data object in the dataset, and this data object is placed in a close for work status. In embodiments, work results may be stored with metadata associated with the data object, or in another manner.

In step 334, the work needed indication for the first/next data object is changed to a work completed indication using a short readers/writer lock. That is, and exclusive access to the readers/writer lock is obtained. For instance, completion indicator 216 may be configured to obtain exclusive access to a readers/writer lock, e.g., via change tracker 220 or otherwise, in order to clear the work needed indication stored with the data object. In embodiments, the lock taken may be a short lock of a duration of microseconds to milliseconds, or approximately the minimum amount of time for the persistent storage to allow for the changing of the work needed indication. After the work needed indication is changed, the lock is released.

In step 336, it is determined if there are any further data objects in data object set with work needed indications. For example, as described above with respect to step 318, work manager 210 is configured to determine if all data objects in the set have had their work operations performed, or whether data objects, and which, remain needing work operations. If no other data objects in the set have work needed indications, flowchart 300 returns to step 318 where other portions of the dataset may be determined as needing work.

If data objects in set remain as having work needed indications, flowchart 300 continues to step 338 where a next data object in data object set is selected for attempting work operations.

Steps 301A may be performed concurrently, in whole or in part, with the performance of steps 310B, and vice versa. For instance, while a work operation is being performed on a data object of a data object set by work service 208, a remote client request to change the first data object, or a child data object thereof, may be received/intercepted by change tracker 220. Similarly, a remote client request to change another data object not in the data object set may be received/intercepted by change tracker 220 while work is being performed.

As noted herein, while work operations are being performed on a data object, a remote client request to change the data object or a child of the data object may be received. In such cases where a request to change the child is made, the work results for the work operation on the data object are rendered invalid because child data has changed which inherently changes work results for the parent data object. Accordingly, the work operation must be performed on the changed child data object, along with any other data objects in the hierarchy between the data object and the child data object, before the work operation can be performed again on the data object to generate new work results.

Figure 4:
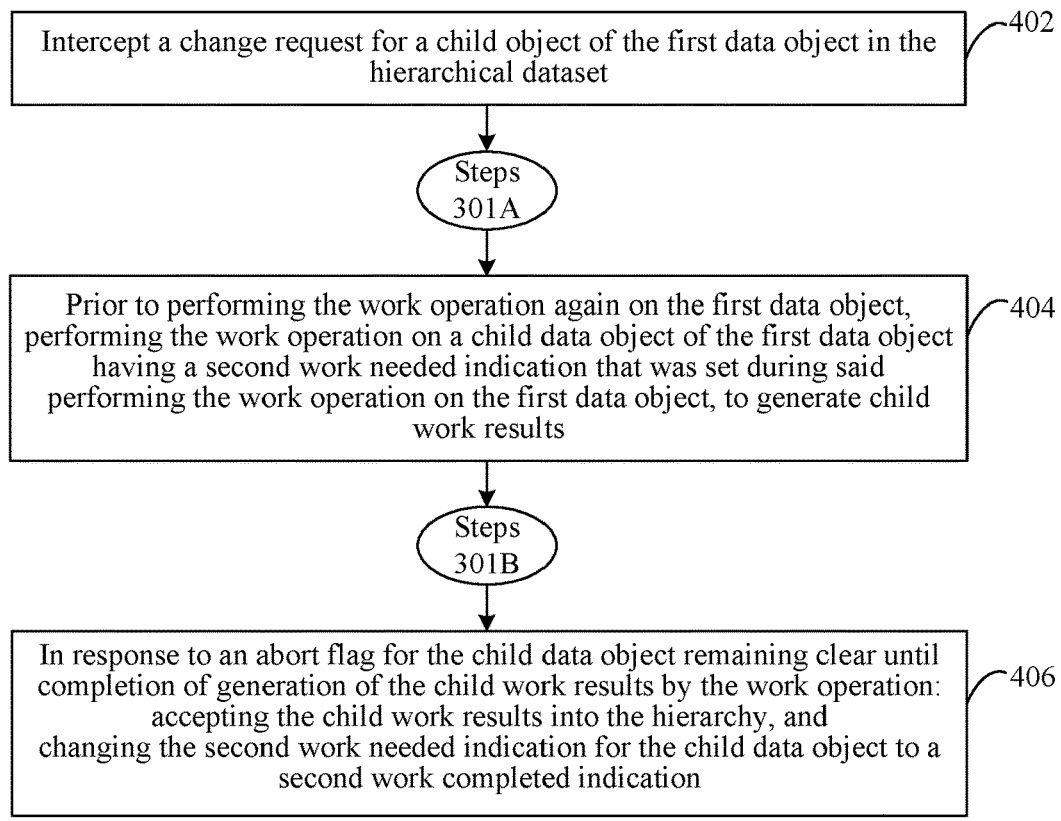
FIG. 4 shows a flowchart for performing work operations and management of hierarchical datasets, in accordance with an example embodiment.

For instance, FIG. 4 shows a flowchart 400 for performing work operations and management of hierarchical datasets, according to an example embodiment. Work service 208 and/or change tracker 220 may operate according to flowchart 400. Flowchart 400 may be a further embodiment of flowchart 300 of FIG. 3. Further structural and operational examples will be apparent to persons skilled in the relevant art(s) based on the following description. Flowchart 400 is described as follows with respect to system 200 of FIG. 2.

Flowchart 400 begins at step 402. In step 402, a change request for a child object of the first data object in the hierarchical dataset is intercepted. For instance, as similarly described for step 302 of flowchart 300, change tracker 220 may be configured to intercept remote client requests to change the data objects, such as data objects that are children of other data objects for which work operations are being performed.

Other steps of steps 301A of flowchart 300 may then be performed for the child data object as similarly described above for the first data object with respect to FIG. 3 prior to step 404 described below.

In step 404, prior to performing the work operation again on the first data object, performing the work operation on a child data object of the first data object having a second work needed indication, that was set during said performing the work operation on the first data object, to generate child work results. For example, as described above for step 326 of flowchart 300, work manager 210 and/or work performer 212 are configured to perform work operations on data objects, such as data objects that are children of other data objects for which work operations are aborted, prior to performing work again on parent data objects.

Other steps of steps 301B of flowchart 300 may then be performed for the child data object as similarly described above for the first data object with respect to FIG. 3 prior to step 406 described below.

In step 406, in response to an abort flag for the child data object remaining clear until completion of generation of the child work results by the work operation: the child work results are accepted into the hierarchy, and the second work needed indication for the child data object is changed to a second work completed indication. For instance, as described above for step 328, step 332, and step 334 of flowchart 300, work manager 210 and/or completion indicator 212 are configured to accept the child work results into the hierarchy and to change the work needed indication for the child data object to a work completed indication if the work operation for the child data object is not aborted.

In other words, when a child data object is changed while work operations are performed on a parent data object, steps 301A and steps 301B of flowchart 300 are performed with respect to the child data object where the child data object is added to the data object set and its parent data objects are not worked on until work results for the child data object are accepted into the hierarchy.

Accordingly, flowchart 300 and flowchart 400 (along with work service 208 and change tracker 220 of system 200) enable performing work operations and management of hierarchical datasets. In this way, performance of computing systems hosting datasets are improved, and work results are maintained coherently, by marking the tops of branches of datasets that do not need work with corresponding flags/indications such that these flags can be recognized by the work service thus causing the executing work service to ignore these branches in performing the work. Valid, coherent work results of such branches are aggregated with newer work results of branches that need work to generate an effective point-in-time result of work for the entire dataset.

B. Example Embodiments for Hierarchical Datasets

As described herein, datasets may be hierarchically organized. Example embodiments for hierarchical datasets, as well as examples for how work operations are performed using work needed indications, are described in this subsection. FIGS. 5A-5D are now described.

Figure 5A:
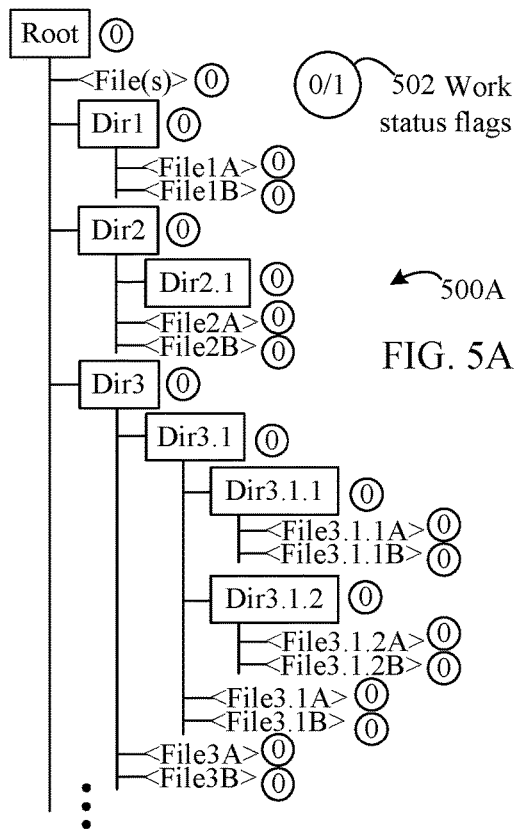

In FIG. 5A, a diagram of a hierarchical dataset 500A is shown, according to an example embodiment. Dataset 500A may be an embodiment of one of dataset(s) 224, described above with respect to system 200 of FIG. 2. Dataset 500A may be any type of dataset, such as those described herein, including a hierarchical dataset. As shown dataset 500A includes directories and files, and the files may include one or more file portions, each of which is considered to be a data object herein. It is contemplated that fewer or additional data objects than those illustrated may be included in embodiments of dataset 500A, as would be understood by those of skill in the relevant art(s) having the benefit of this disclosure.

Dataset 500 includes a root directory having zero or more files therein. The root directory shown also has three child directories: Dir1, Dir2, and Dir3. Dir1 includes a first file File1A and a second file File1B. Dir2 includes a first file File2A and a second file File2B, as well as a child subdirector Dir2.1. Dir3 includes a first file File3A and a second file File3B, as well as a child subdirectory Dir3.1. Dir3.1 includes a first file File3.1A and a second file File3.1B, as well as a child subdirectory Dir3.1.1 and a child subdirectory Dir3.1.2. Dir3.1.1 includes a first file File3.1.1A and a second file File3.1.1B, and Dir3.1.2 includes a first file File3.1.2A and a second file File3.2.1B.

Dataset 500A includes a set of work status indications 502 (or "flags") which may be persistently stored with their respective data object in dataset 500A. As shown in dataset 500A, each of work status indications 502 is cleared to '0' indicating a work completed status or that work is not needed. It should be understood that in embodiments a set bit of '1' may alternatively be used to show work completed. Accordingly, dataset 500A may represent a hierarchical dataset for which all work operations have been completed or for which no work operations have yet been performed.

Figure 5B:
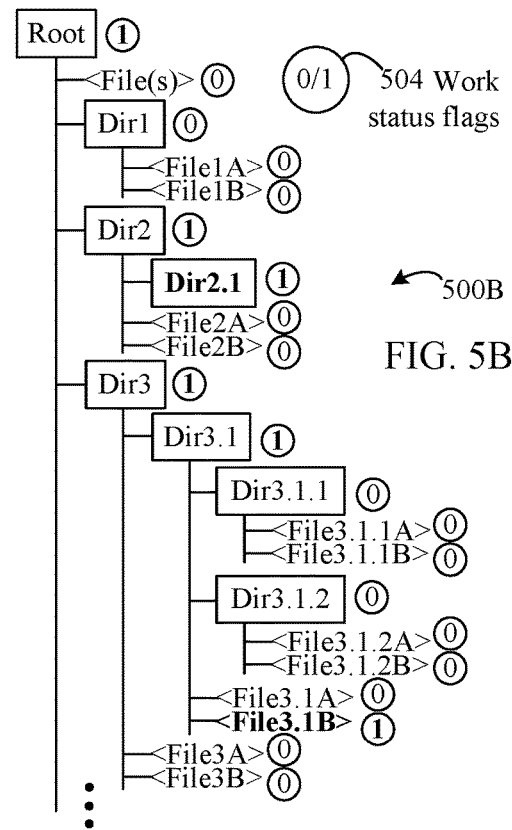

In FIG. 5B, a diagram of a hierarchical dataset 500B is shown, according to an example embodiment. Dataset 500B includes a set of work status indications 504 (e.g., "flags") that may be set by a change tracker and cleared by a work service as described herein. Dataset 500B is an embodiment of dataset 500A subsequent to requested changes to data objects having been made. For instance, dataset 500B shows an example in which File3.1B (e.g., content of the file) and Dir2.1 (e.g., name, contents, metadata, etc.) have been changed.

Regarding the change to Dir2.1, this change causes the work flag for Dir2.1, which is one of work status indications 504, to indicate that work is needed (shown as '1'). Accordingly, each parent data object of Dir2.1 also has its respective work flag of work status indications 504 set to '1' to indicated work needed—thus, Dir2 and Root each have work needed indications set where there flags are '1'. Similarly, for File3.1B, the change for this data object causes the work flag of work status indications 504 for File3.1B to indicate that work is needed (shown as '1'), and the flags for each of its parent data objects are also set to '1' up to the Root: Dir3.1, Dir3, and Root.

Assuming for this example that work was completed on dataset 500A to determine a hash of the content, then as shown in dataset 500B changes to data objects were made, the work operations to determine the hash of the dataset are performed again on each data object with a work needed indication from the bottom of the hierarchy up: [{Dir2.1, Dir2} and {File3.1B, Dir3.1, Dir3}, then Root]. The remaining data objects do not need work performed, so a work manager may ignore these data objects to determine their hashes and instead use previously determined hash data from prior work results that is persistently stored at the top level of branches (or at each leaf) that show no work needed.

Figure 5C:
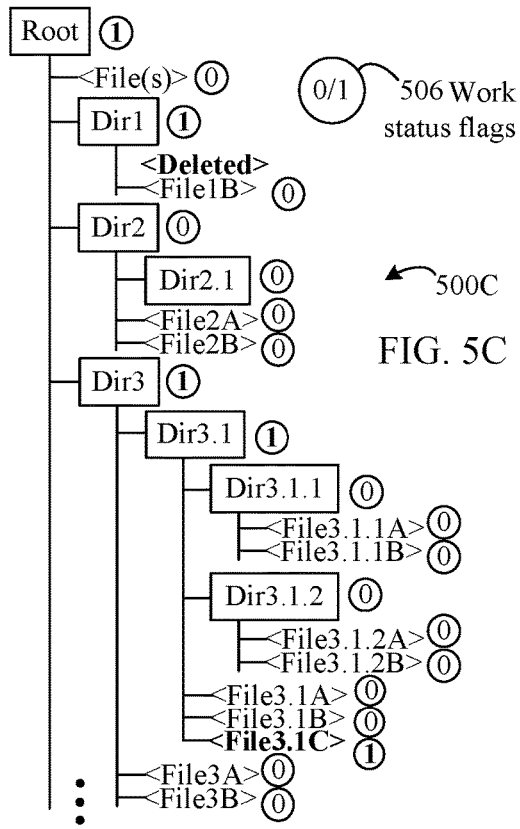

In FIG. 5C, a diagram of a hierarchical dataset 500C is shown, according to an example embodiment. Dataset 500C includes a set of work status indications 506 (e.g., "flags"). Dataset 500C is an embodiment of dataset 500A subsequent to requested changes to data objects having been made. For instance, dataset 500C shows an example in which File1A has been deleted and File3.1C has been added.

Regarding the deletion of File1A, this change causes the work flag of work status indications 506 for File1A to be deleted. Accordingly, each parent data object of File1A also has its respective work flag of work status indications 506 set to '1' to indicate work needed—thus, Dir1 and Root each have work needed indications set where there flags are '1'. Similarly, for File3.1C, the addition for this data object causes the work flag of work status indications 506 for File3.1C to indicate that work is needed (shown as '1'), and the ingestion of File3.1C may include creating this data object with its work flag set as '1', and the flags for each of its parent data objects are also set to '1' up to the Root: Dir3.1, Dir3, and Root.

Assuming for this example that work was completed on dataset 500A to determine a size of the content, then as shown in dataset 500C changes to data objects were made, the work operations to determine the size of the dataset are performed again on each data object with a work needed indication from the bottom of the hierarchy up: [{Dir1} and {File3.1C, Dir3.1, Dir3}, then Root]. The remaining data objects do not need work performed, so a work manager may ignore these data objects to determine their hashes and instead use previously determined hash data from prior work results that is persistently stored at the top level of branches (or at each leaf) that show no work needed.

Figure 5D:
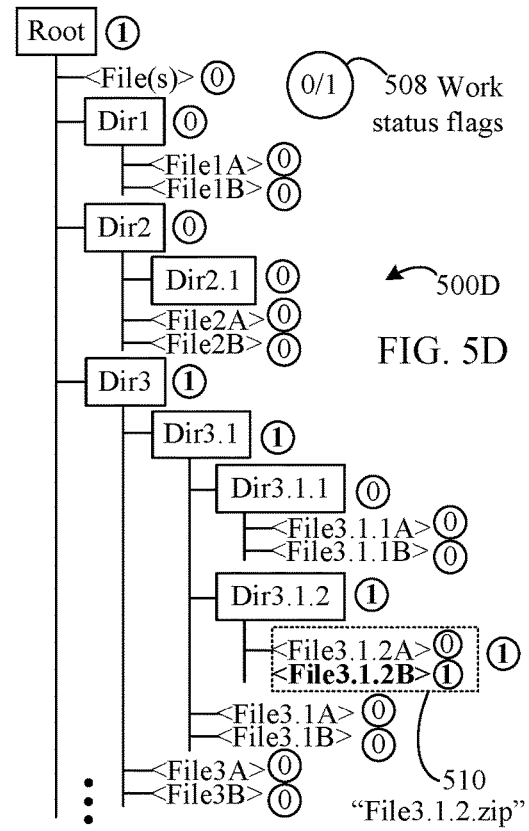

In FIG. 5D, a diagram of a hierarchical dataset 500D is shown, according to an example embodiment. Dataset 500D includes a set of work status indications 508 (i.e., "flags"). Dataset 500D is an embodiment of dataset 500A subsequent to requested changes to data objects having been made. For instance, dataset 500D shows an example in which File3.1.2A and File 3.1.2B were previously aggregated as a file aggregation 510 (e.g., as "File3.1.2.zip" or "File3.1.2.tar"), and now information associated with File3.1.2B, which now resides only in file aggregation 510, has been modified via remote client request.

Regarding the change to File3.1.2B, this change causes the work flag of work status indications 508 for file aggregation 510 (e.g., as "File3.1.2.zip" or "File3.1.2.tar") to indicate that work is needed (shown as '1'). In some embodiments, File3.1.2B may de-aggregated to make the requested change causing its work flag of work status indications 508 to be set. Again, each parent data object of File3.1.2B also has its respective work flag of work status indications 508 set to '1' to indicated work needed—thus, file aggregation 510, Dir3.1.2, Dir3.1, Dir3, and Root each have work needed indications set where there flags are '1'.

Assuming for this example that work was completed on dataset 500A to form file aggregation 510, the work operations to aggregation files of the dataset are performed again on each data object with a work needed indication from the bottom of the hierarchy up, beginning with the files in Dir3.1.2. The remaining, unmarked data objects do not need work performed, so a work manager may ignore these data objects. In aggregation embodiments such as file aggregation 510, it is contemplated that parent data objects of the aggregation may or may not be re-aggregated, so the work manager performs any needed re-aggregation for file aggregation 510. In this example, if File3.1.2B was removed from file aggregation 510 in order to be changed, then File3.1.2B is again aggregated into file aggregation 510. If no further aggregation is needed to be performed, the work service may clear the remaining work status indications 508 set for the aggregation in this example without performing actual work operations for aggregation. However, in some embodiments where a dataset size has been determined, the work service may leave work status indications 508 set so that work operations for sizing may be performed again.

This example is also applicable to the addition of new files which may be included into file aggregation 510 by aggregation operations, as well as to the changing of one or more of the files included in file aggregation 510 during the initial aggregation operation.

Regarding the aggregation example above, it should be noted that small files are problematic for many input/output (I/O) systems. Writing 100 small files to a hard disk, for example, may take a full second of time because the mechanical armature of the hard disk is limited to roughly 100 I/Os per second. Copying these small files would take two full seconds, i.e., one second to read the source and then one second to write the destination. If these same files were aggregated (e.g., into a .zip, .tar, etc. file) before being copied, they could then be copied in roughly 10 milliseconds, as a single I/O transaction (plus filesystem allocation overhead). Small files also pay storage fragmentation overhead costs, which can be even greater than the performance overhead in some cases.

Accordingly, there is value in work operations that performs post-ingress aggregation of small files that are likely to want to be managed (or copied) together. After ingress, if these small files are aggregated into a single file, and if the files rarely change, then the operation of the system hosting the dataset that includes this files subsequently manages the data more efficiently after aggregation. As noted above, times for I/O operations are greatly reduced, and hard disk utilization is also reduced thus increasing the lifespan of the hardware. Additionally, fragmentation issues are alleviated. Small files like these, that are ingressed independently, and then aggregated together after ingress, are typical of IoT scenarios.

Turning now to FIG. 6, the concept of catching up on work, or never catching up, is discussed. In FIG. 6, a conceptualized diagram of a dataset 600 is shown, according to an example embodiment.

As new data is ingressed into the dataset, or existing data in the dataset is modified or deleted, the performance of work operations is always behind, or lagging, the changes made to the dataset. That is, the embodiments described herein allow for the access and the changes to the dataset by users to take priority over the performance of work operations, and also allows temporal coalescing of work operations (e.g., if a data object changes a number of times between work cycles, the work cycle only has to work on the data object for the last, or most recent, change). If work catches up fully to dataset changes, e.g., if the dataset stops changing and the work service keeps running, there will be a single coherent work result for the entire dataset stored with the root portion of the hierarchy.

However, if work operations do not catch up to dataset changes due to frequent remote user requests, older portions of the dataset still have valid work results stored and aggregated partially up the hierarchy (and their "work needed" flags are clear); whereas, newer portions of the dataset do not have valid work results stored (and their "work needed" flags are set). This establishes a work needed/work complete boundary in the hierarchy of the dataset. Generally, for a continually changing dataset, the root portion of the hierarchy may always be set to "work needed", and the older, stable portions of the dataset are marked "work complete:"

Dataset 600 may be stored in a storage 602, which may be an embodiment of storage 114 of FIG. 1 and/or memory 206 of FIG. 2, and may be any type of dataset described herein, including a hierarchical dataset. As illustrated, dataset 600 includes a work needed portion 604 and a work complete portion 606. That is, some portions of datasets may need work performed on data objects because of more frequent changes to data objects in those portions of the datasets, e.g., work needed portion 604. In contrast, other portions of datasets may not need work performed on data objects because of infrequent changes to data objects in those other portions of the datasets, e.g., work complete portion 606. Between work needed portion 604 and work complete portion 606 is a work boundary 608.

It should be noted that at the top of work boundary 608, there exists partially aggregated work results for all the portions of the dataset below boundary 608, i.e., for work complete portion 606. These results, however, have not yet been fully aggregated into a single root result or final work result for the whole hierarchy because of changes to data objects in work needed portion 604 that require work operations to be performed again on the changed data objects in that section. Thus, to scan the entire hierarchy for persistent results, only the portion the hierarchy above the boundary, i.e., work needed section 604, would need to be traversed down to work boundary 608 because multiple coherent and persistent work results are stored just below work boundary 608 with the work-complete data objects there.

Accordingly, the work service described may function as a background service that operates in a "catch up" mode with respect to changes made to data objects of the datasets. It should be noted that the persistent hierarchical work manager described herein is configured to run as a background service, rather than as a synchronous step of the write path for data objects, thus allowing not only temporal aggregation of work (i.e., if a data object is modified ten times quickly, a work operation need only be performed once, after the tenth modification), but also takes advantage of the economy of scale (i.e., in embodiments, work operations may be delayed, such as having the work service sleep, until a threshold for the quantity of overall work operations needed is reached).

In embodiments, the background work service may operate as being behind on performing transformation work operations, but always trying to catch up once the work service discovers work to be performed. If the dataset stops changing (e.g., temporarily), it is possible for the background service to completely catch up on transformation work operations and have nothing more to do until a change to dataset is made. If the dataset never stops changing, the background work service may remain behind, but it will be as close to catching up as possible, with only transformation work operations for the most recent changes left to do.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100 of FIG. 1, system 200 of FIG. 2, the datasets of FIGS. 5A-5B of FIG. 5, and dataset 600 of FIG. 6, along with any components and/or subcomponents thereof, as well as the flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 7 depicts an exemplary implementation of a computing device 700 in which embodiments may be implemented. For example, embodiments described herein may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems and/or game consoles, etc., as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing embodiments described herein, such as system 100 of FIG. 1, system 200 of FIG. 2, the datasets of FIGS. 5A-5B of FIG. 5, and dataset 600 of FIG. 6, along with any components and/or subcomponents thereof, as well as the plots and flowcharts/flow diagrams described herein and/or further examples described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium," etc., are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including memory 720 of FIG. 7). Such computer-readable media and/or computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

Furthermore, the disclosed embodiments do not exist in software implementations for performing work operations and management of hierarchical datasets. Current solutions require that work operations be re-performed for entire datasets when changes thereto are made or that all changes are journaled and the journal is subsequently read to guide a subset of work operations which increases complexity for maintaining coherency and impacts performance of the dataset and its host. The embodiments herein enable coherent work to be performed on huge datasets and on datasets that may not have all portions thereof accessible all at the same time. The ability to hierarchically aggregate work results, and to get a single coherent work result as if a huge dataset was accessible all at once and as if all work was performed at once is thus enabled.

That is, the disclosed embodiments provide for the ability to maintain work for a changing dataset with a minimal amount of re-work, i.e., performing the same work operations again, and only re-performing work for portions of datasets that have actually changed, and only as often, at most, as the actual changes occur. Also, the performance impact for ingestion of data objects into the dataset is greatly reduced. The net effect is that work computation is much more efficient than the prior approaches of re-computing work whenever a client needs to know the work result (e.g., when the client queries "how big is this directory?" or "how big is this dataset"). In other words, with the use of work needed indications persistently stored with data objects by an independent change tracker, as well as a work service that is aware of dataset branches that do not need work performed, systems complete work faster and more accurately through persistent coherency of work results, fewer hard disk accesses, etc., while still allowing accesses by clients to the datasets to take priority over work operations being performed. When datasets stop changing for a relatively short period of time, a single, coherent work result is thus obtained with a minimal amount of additional work, to push the work needed/work complete boundary of the datasets up to the root level.

Accordingly, a thin change tracker acts as the gatekeeper to the dataset intercepting and synchronizing both client change requests and work service transformation attempts, while a thick work service running on the side or in the background (or possibly even in a different failure domain, like the application space of the system, or even in a different geography like the cloud) to perform different work operations in a way that does not actually impact the availability or performance of the dataset or the performance of ingestion of data objects into the dataset. That is, the change tracker and work service operate independently and their paths to the dataset only converge at the filesystem filter driver in order to maintain coherency through its internal synchronization mechanism and the volatile work aborted flags/indications in RAM.

The described work aborted flags are used by systems described herein rather than traditional synchronous locking used by prior solutions. That is, work transformations can be slow, or at least slower than client accesses to datasets, and providing for repeating the work on changed data is preferred to slowing down client accesses to the dataset. In other words, exclusive locks for the dataset are not needed by the work service while attempting to perform the work. Instead, the described systems herein embody a hybrid lock/lockless synchronization mechanism where locks are taken and released quickly for writing to the persistent dataset or simply manipulating an in-memory volatile lock and testing an in-memory volatile work aborted flag, whereas the lockless part may be slow (e.g., as slow as the work itself which may involve accessing all of the data for a portion of the dataset, including at remote locations such as the cloud).

Furthermore, disclosed embodiments provide for the maintenance of coherent transforms for distributed datasets, where portions of the dataset may not be available at the same time is provided and enabled. In such embodiments, change tracker intercept points are configured to execute independently at their respective, distributed locations such that it is determined which portions of a dataset are current and which are out of date. Therefore, a work service may be configured to do work from other distributed/geographic locations asymmetrically (i.e., the work service is not required to be resident). In some cloud implementations, the intercept layer of the change tracker may reside about the cloud stack in application space, in the filesystem, elsewhere in the kernel, and/or the like.

If the work service is unable to execute its functions (e.g., when the data that is being read is only on the cloud and the cloud connection is down, or the system is busy and defers work to off-hours), or when the work service cannot execute for a particular portion of the dataset, the change tracker is nevertheless configured to execute, and client I/O requests can still be serviced in a completely coherent manner. In such scenarios, the work is deferred until a later time, and upon resuming execution, the work service attempts to catch up with the work needed.

According to embodiments, the work service is configured to copy or even move the data objects of the dataset from the local filesystem to the cloud or other remote location, leaving only a thumbprint in the local filesystem. The filter driver is configured to detect this condition and route client read requests directly to the location of the data objects/dataset.

Moreover, the disclosed embodiments provide for the handling of first-time ingresses of datasets where the work needed flags are set for leaf data objects with no or negligible impact to system performance, unlike traditional journaling mechanisms that track changes.

The additional examples and embodiments described in this Section may be applicable to examples disclosed in any other Section or subsection of this disclosure.

A work service system is described herein. The work service system may be configured and enabled in various ways to perform management for, and work on, hierarchical datasets, as described herein. A hierarchical dataset may include a plurality of data objects stored in a hierarchy, the plurality of data objects including a root data object and a first data object in the hierarchy below the root data object. The work service system includes at least one memory configured to store program instructions. The work service system also includes at least one processor configured to execute the program instructions. The program instructions include a change tracker configured to set an abort flag for the first data object, and mark the first data object with a first work needed indication. The program instructions also include a work manager configured to determine the first data object is indicated with the first work needed indication indicating that a work operation is to be performed on the first data object, and perform the work operation on the first data object to generate work results subsequent to clearing the abort flag for the first data object. The program instructions further include an abort manager configured to determine the abort flag for the first data object remains cleared subsequent to completion of generation of the work results by the work operation, and a completion indicator configured to accept the work results into the hierarchy in response to the abort flag for the first data object remaining cleared until completion of generation of the work results by the work operation and change the first work needed indication for the first data object to a first work completed indication.

In an embodiment of the work service system, the change tracker is configured to recursively enumerate child data objects of the root data object in the hierarchy to generate a data object set including data objects with work needed indications, the data object set including the first data object.

In an embodiment of the work service system, the work manager is configured to perform the work operation for each other data object in the data object set to generate set work results, ignore unchanged data objects outside of the data object set for performing the work operation, collect prior work results from top level data objects of the unchanged data objects outside of the data object set, and determine final work results based on the prior work results and the set work results.

In an embodiment of the work service system, the change tracker comprises a filesystem filter driver of a kernel and is configured to, prior to said marking the first data object with the first work needed indication, intercept a remote client request to change the first data object, and obtain shared access to a readers/writer lock for the first data object.

In an embodiment of the work service system, the change tracker is configured to set the abort flag for the first data object during performance of the work operation on the first data object to generate work results responsive to a remote client request to change the first data object or at least one child object of the first data object. In the embodiment, the completion indicator configured to discard the work results in response to the abort flag for the first data object being set before completion of generation of the work results by the work operation. In the embodiment, the work manager is configured to perform the work operation on the at least one child data object to generate child work results, and subsequently perform the work operation again on the first data object to generate new work results.

In an embodiment of the work service system, the work manager is configured to perform one or more work operations to maintain a size of the hierarchical dataset, create a hash of the hierarchical dataset, create a mirror or copy of the hierarchical dataset, determine validity of one or more portions of the hierarchical dataset, or aggregate files of the hierarchical dataset.

In an embodiment of the work service system, the work manager is configured to perform the work operation on the first data object to generate the work results without a readers/writer lock for the first data object, and the completion indicator is configured to accept the work results into the hierarchy with a readers/writer lock for the first data object.

In an embodiment of the work service system, the first data object includes at least one of a directory, a file, or a file portion. In an embodiment of the work service system, the work needed indication comprises a filesystem file attribute bit being set or cleared. In an embodiment of the work service system, the change tracker is configured to mark the first data object with the first work needed indication when the first data object is added to the hierarchical dataset.

A computer-implemented method for a work manager is described herein. In embodiments of the method, the work manager manages work performed on a hierarchical dataset that includes a plurality of data objects stored in a hierarchy, the plurality of data objects including a root data object and a first data object in the hierarchy below the root data object. The method includes determining the first data object is indicated with a first work needed indication indicating that a work operation is to be performed on the first data object, and performing the work operation on the first data object to generate work results. The method also includes, in response to an abort flag for the first data object remaining clear until completion of generation of the work results by the work operation, accepting the work results into the hierarchy, and changing the first work needed indication for the first data object to a first work completed indication.

In an embodiment, the method includes setting the abort flag for the first data object, and marking the first data object with the first work needed indication. In the embodiment, said determining the first data object is indicated with a first work needed indication indicating that a work operation is to be performed on the first data object includes recursively enumerating child data objects of the root data object in the hierarchy to generate a data object set including data objects with work needed indications, the data object set including the first data object.

In an embodiment, the method includes prior to said marking the first data object with the first work needed indication, intercepting a remote client request to change the first data object, and obtaining shared access to a readers/writer lock for the first data object.

In an embodiment of the method, said setting the abort flag for the first data object is performed asynchronously with respect to said performing the work operation on the first data object to generate the work results.

In an embodiment, the method includes clearing the abort flag for the first data object prior to said performing the work operation on the first data object to generate work results, and in response to the abort flag for the first data object becoming set before completion of generation of the work results by the work operation, discarding the work results of the work operation after completion of generation of the work results and performing the work operation again on the first data object to generate new work results.

In an embodiment of the method, performing the work operation again on the first data object to generate the new work results includes prior to performing the work operation again on the first data object, performing the work operation on a child data object of the first data object having a second work needed indication, that was set during said performing the work operation on the first data object, to generate child work results. In the embodiment, in response to an abort flag for the child data object remaining clear until completion of generation of the child work results by the work operation, accepting the child work results into the hierarchy, and changing the second work needed indication for the child data object to a second work completed indication.

In an embodiment of the method, the work operation includes one or more operations for maintaining a size of the hierarchical dataset, creating a hash of the hierarchical dataset, creating a mirror or copy of the hierarchical dataset, determining validity of one or more portions of the hierarchical dataset, or aggregating files of the hierarchical dataset.

In an embodiment of the method, said performing the work operation on the first data object is performed without a readers/writer lock for the first data object, and said accepting the work results into the hierarchy and said changing the first work needed indication for the first data object are performed with a readers/writer lock for the first data object.

In an embodiment of the method, the first data object includes at least one of a directory, a file, or a file portion. In an embodiment of the method, the work needed indication comprises a file attribute bit being set or cleared. In an embodiment of the method, the first data object is marked with the first work needed indication when the first data object is added to the hierarchical dataset.

A computer-readable storage medium having program instructions recorded thereon that, when executed by a processing device, perform a method for a work manager is also described. The method for the work manger may be performed on a hierarchical dataset that includes a plurality of data objects stored in a hierarchy, the plurality of data objects including a root data object and a first data object in the hierarchy below the root data object. The method includes intercepting a remote client request to change the first data object, and marking the first data object with the first work needed indication. The method also includes, subsequent to said marking, determining the first data object is indicated with a first work needed indication indicating that a work operation is to be performed on the first data object, and performing the work operation on the first data object to generate work results. The method further includes, in response to an abort flag for the first data object remaining clear until completion of generation of the work results by the work operation, accepting the work results into the hierarchy, and changing the first work needed indication for the first data object to a first work completed indication.

In an embodiment of the computer-readable storage medium, the method includes setting the abort flag for the first data object responsive to intercepting a remote client request to change the first data object or a child object of the first data object, discarding the work results of the work operation after completion of generation of the work results based on a determination of the presence of the abort flag, and performing the work operation again on the first data object to generate new work results subsequent to a determination that any child data objects of the first data object each have respective work completed indications.

In an embodiment of the computer-readable storage medium, the work operation includes one or more operations for maintaining a size of the hierarchical dataset, creating a hash of the hierarchical dataset, creating a mirror or copy of the hierarchical dataset, determining validity of one or more portions of the hierarchical dataset, or aggregating files of the hierarchical dataset.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A work service system for management of and performance of work on a hierarchical dataset that includes a plurality of data objects stored in a hierarchy, the plurality of data objects including a root data object and a first data object in the hierarchy below the root data object, the work service system comprising:
at least one memory configured to store program instructions;
at least one processor configured to execute the program instructions, the program instructions including:
setting an abort flag for the first data object;
marking the first data object with a first work needed indication;
determining the first data object is indicated with the first work needed indication indicating that a work operation is to be performed on the first data object;
performing the work operation on the first data object to generate work results subsequent to clearing the abort flag for the first data object;
determining the abort flag for the first data object remains cleared subsequent to completion of generation of the work results by the work operation;
accepting the work results into the hierarchy in response to the abort flag for the first data object remaining cleared until completion of generation of the work results by the work operation; and
changing the first work needed indication for the first data object to a first work completed indication.

2. The work service system of claim 1, wherein the program instructions include:
recursively enumerate child data objects of the root data object in the hierarchy to generate a data object set including data objects with work needed indications, the data object set including the first data object.

3. The work service system of claim 2, wherein the program instructions include:
performing the work operation for each other data object in the data object set to generate set work results;
ignoring unchanged data objects outside of the data object set for performing the work operation;
collecting prior work results from top level data objects of the unchanged data objects outside of the data object set; and
determining final work results based on the prior work results and the set work results.

4. The work service system of claim 1, wherein the program instructions, via a filesystem filter driver of a kernel, include:
prior to said marking the first data object with the first work needed indication:
intercepting a remote client request to change the first data object, and
obtaining shared access to a readers/writer lock for the first data object.

5. The work service system of claim 4, wherein the program instructions include:
setting the abort flag for the first data object during performance of the work operation on the first data object to generate work results responsive to a remote client request to change the first data object or at least one child object of the first data object;
discarding the work results in response to the abort flag for the first data object being set before completion of generation of the work results by the work operation;
performing the work operation on the at least one child data object to generate child work results; and
subsequently performing the work operation again on the first data object to generate new work results.

6. The work service system of claim 1, wherein the program instructions perform one or more work operations to:
maintain a size of the hierarchical dataset;
create a hash of the hierarchical dataset;
create a mirror or copy of the hierarchical dataset;
determine validity of one or more portions of the hierarchical dataset; or
aggregate files of the hierarchical dataset.

7. The work service system of claim 1, wherein the program instructions include:
performing the work operation on the first data object to generate the work results without a readers/writer lock for the first data object; and
accepting the work results into the hierarchy with a readers/writer lock for the first data object.

8. The work service system of claim 1, wherein the first data object includes at least one of a directory, a file, or a file portion;
wherein the first work needed indication comprises a filesystem file attribute bit being set or cleared; or wherein the program instructions include marking the first data object with the first work needed indication when the first data object is added to the hierarchical dataset.

9. A computer-implemented method for a work manager that manages work performed on a hierarchical dataset that includes a plurality of data objects stored in a hierarchy, the plurality of data objects including a root data object and a first data object in the hierarchy below the root data object, the method comprising:

setting an abort flag for the first data object; and marking the first data object with a first work needed indication;

determining the first data object is indicated with the first work needed indication indicating that a work operation is to be performed on the first data object;

performing the work operation on the first data object to generate work results subsequent to clearing the abort flag for the first data object;

determining the abort flag for the first data object remains cleared subsequent to completion of generation of the work results by the work operation; and in response to the abort flag for the first data object remaining clear until completion of generation of the work results by the work operation, accepting the work results into the hierarchy, and changing the first work needed indication for the first data object to a first work completed indication.

10. The computer-implemented method of claim 9, wherein said determining the first data object is indicated with a first work needed indication indicating that a work operation is to be performed on the first data object comprises:

recursively enumerating child data objects of the root data object in the hierarchy to generate a data object set including data objects with work needed indications, the data object set including the first data object.

11. The computer-implemented method of claim 10, further comprising:

prior to said marking the first data object with the first work needed indication:

intercepting a remote client request to change the first data object, and obtaining shared access to a readers/writer lock for the first data object.

12. The computer-implemented method of claim 11, wherein said setting the abort flag for the first data object is performed asynchronously with respect to said performing the work operation on the first data object to generate the work results.

13. The computer-implemented method of claim 9, further comprising:

clearing the abort flag for the first data object prior to said performing the work operation on the first data object to generate work results; and in response to the abort flag for the first data object becoming set before completion of generation of the work results by the work operation, discarding the work results of the work operation after completion of generation of the work results, and performing the work operation again on the first data object to generate new work results.

14. The computer-implemented method of claim 13, wherein performing the work operation again on the first data object to generate the new work results includes:

prior to performing the work operation again on the first data object, performing the work operation on a child data object of the first data object having a second work needed indication, that was set during said performing the work operation on the first data object, to generate child work results;

in response to an abort flag for the child data object remaining clear until completion of generation of the child work results by the work operation, accepting the child work results into the hierarchy, and changing the second work needed indication for the child data object to a second work completed indication.

15. The computer-implemented method of claim 9, wherein the work operation includes one or more operations for:

maintaining a size of the hierarchical dataset;

creating a hash of the hierarchical dataset;

creating a mirror or copy of the hierarchical dataset;

determining validity of one or more portions of the hierarchical dataset; or aggregating files of the hierarchical dataset.

16. The computer-implemented method of claim 9, wherein said performing the work operation on the first data object is performed without a readers/writer lock for the first data object; and wherein said accepting the work results into the hierarchy and said changing the first work needed indication for the first data object are performed with a readers/writer lock for the first data object.

17. The computer-implemented method of claim 9, wherein the first data object includes at least one of a directory, a file, or a file portion;

wherein the first work needed indication comprises a file attribute bit being set or cleared; or wherein the first data object is marked with the first work needed indication when the first data object is added to the hierarchical dataset.

18. A computer-readable storage medium having program instructions recorded thereon that, when executed by a processing device, perform a method for a work manager performed on a hierarchical dataset that includes a plurality of data objects stored in a hierarchy, the plurality of data objects including a root data object and a first data object in the hierarchy below the root data object, the program instructions comprising:

intercepting a remote client request to change the first data object;

setting an abort flag for the first data object;

marking the first data object with a first work needed indication;

subsequent to said marking:

determining the first data object is indicated with a first work needed indication indicating that a work operation is to be performed on the first data object, and performing the work operation on the first data object to generate work results subsequent to clearing the abort flag for the first data object;

determining the abort flag for the first data object remains cleared subsequent to completion of generation of the work results by the work operation; and in response to the abort flag for the first data object remaining clear until completion of generation of the work results by the work operation, accepting the work results into the hierarchy, and changing the first work needed indication for the first data object to a first work completed indication.

19. The computer-readable storage medium of claim 18, wherein the program instructions further include:
   setting the abort flag for the first data object responsive to intercepting a remote client request to change the first data object or a child object of the first data object;
   discarding the work results of the work operation after completion of generation of the work results based on a determination of the presence of the abort flag; and
   performing the work operation again on the first data object to generate new work results subsequent to a determination that any child data objects of the first data object each have respective work completed indications.

20. The computer-readable storage medium of claim 18, wherein the work operation includes one or more operations for:
   maintaining a size of the hierarchical dataset;
   creating a hash of the hierarchical dataset;
   creating a mirror or copy of the hierarchical dataset;
   determining validity of one or more portions of the hierarchical dataset; or
   aggregating files of the hierarchical dataset.

\* \* \* \* \*